(12) United States Patent
Lin et al.

(10) Patent No.: US 7,342,570 B2
(45) Date of Patent: Mar. 11, 2008

(54) OPTICAL MOUSE AND IMAGE CAPTURE CHIP THEREOF

(75) Inventors: Chun-Huang Lin, Hsinchu (TW); Jeng-Feng Lan, Hsinchu (TW)

(73) Assignee: PixArt Imaging, Inc., Hsin-Chu (TW)

( * ) Notice: Subject to any disclaimer, the term of this patent is extended or adjusted under 35 U.S.C. 154(b) by 656 days.

(21) Appl. No.: 10/865,568

(22) Filed: Jun. 10, 2004

(65) Prior Publication Data
US 2005/0157202 A1 Jul. 21, 2005

(30) Foreign Application Priority Data
Jan. 16, 2004 (TW) .............................. 93101153 A

(51) Int. Cl.
G09G 5/08 (2006.01)
G03B 13/00 (2006.01)
(52) U.S. Cl. ...................................... 345/166; 348/362
(58) Field of Classification Search ................ 345/163, 345/166; 348/362
See application file for complete search history.

(56) References Cited

U.S. PATENT DOCUMENTS 6,297,513 B1* 10/2001 Oliver et al. ............... 250/548

2004/0160411 A1* 8/2004 Yang ........................... 345/156
2005/0195314 A1* 9/2005 Fossum et al. ............. 348/362

* cited by examiner

Primary Examiner—Amr A. Awad
Assistant Examiner—Randal L Willis
(74) Attorney, Agent, or Firm—Tung & Associates

(57) ABSTRACT

An optical mouse and image capture chip thereof. The image capture chip comprises an image sensor, a calculating logic circuit, and a refreshing logic circuit. The image sensor has a plurality of sensor units, capturing an image according to an exposure parameter to provide a plurality of exposure values. The calculating logic circuit provides an average exposure value by calculating the exposure values. If the exposure sample is within a first exposure range, the refreshing logic circuit maintains the exposure parameter and accordingly drives the image sensor to capture a next image. If the average exposure value is within a second exposure range, the refreshing logic circuit adjusts the exposure parameter with a first exposure extreme and accordingly drives the image sensor to capture a next image. If the average exposure value is within a third exposure range, the refreshing logic circuit adjusts the exposure parameter with a second exposure extreme and accordingly drives the image sensor to capture a next image.

4 Claims, 8 Drawing Sheets

OPTICAL MOUSE AND IMAGE CAPTURE CHIP THEREOF

BACKGROUND OF THE INVENTION

1. Field of the Invention

The invention relates to an optical mouse having an image capture chip, and more particularly to an image capture chip capable of effectively adjusting an exposure value.

2. Description of Related Art

Recently, image capture chips are widely used in various digital devices such as digital cameras, video cameras, and optical pointing devices. Image capture chips play an important role in capturing a projected image of an object for subsequent related digital image processing. Based on a theory of exposure, the image capture chip adjusts an exposure parameter according to an illumination of the object, thereby determining a suitable exposure duration.

Thus, by using the adjusted exposure parameter, the corresponding average exposure value thereof is able to be converged within a normal-exposure range, even if the illumination of the object is too dark or too bright.

FIG. 1A is a diagram of a conventional image capture chip. Each of the pixel units PIX11~PIXnm is a pixel circuit of the image sensor 100. The image capture chip 10, initially, reads captured image data line by line and stores the pixel signals of the pixel units PIX11~PIXnm via a signal reading circuit 130. The pixel signals of the signal reading circuit 130 are amplified by an amplifier 150. Finally, the A/D converter 170 converters the amplified pixel signals into a plurality of digital pixels. Thus, a digital signal processor (DSP) 11 accordingly performs related image processing such as calculating the average exposure value or displaying the captured image.

FIG. 1B is a diagram of the image sensor 100 of FIG. 1A. If a CMOS M2 is turned on according to a reset signal RES, the potential across an optical diode PD is charged to a voltage Vrst. The voltage Vrst decreases as the optical diode PD is exposed under the illumination of the image. Each row of sensor units PIX1m~PIXnm as shown in FIG. 1A comprises its storage 131. When a NMOS M3 is turned on by a select signal RSEL2, the residual voltage across the optical diode PD is transformed into a current across an NMOS M1. The current charges a corresponding storage 131 of a signal reading circuit 130. The charge of each storage 131 is referred to as an illumination value of the corresponding pixel unit.

The illumination intensity and the illumination duration of the optical diode PD are referred to as an exposure intensity and an exposure duration of the image sensor 100, respectively. Based on the theory "Exposure value=Exposure intensity*Exposure duration", the exposure value can be adjusted if the exposure duration or the illumination duration is changed. Hence, to maintain the exposure quantity, the exposure duration is decreased when the exposure intensity is increased. Alternatively, the exposure duration is increased when the exposure intensity is decreased.

Generally, an exposure parameter is provided for adjusting the exposure duration. For example, to increase the exposure value according to the conventional exposure control method, the exposure parameter is linearly added with a predetermined exposure parameter. Alternatively, for decrease the exposure value, the exposure parameter is linearly subtracted by a predetermined exposure parameter.

It is difficult, however, to define the predetermined exposure parameter of the conventional exposure control method. For example, if the exposure parameter is adjusted with an excessively large predetermined exposure parameter, the illumination of a digital image is substantially changed. Thus, it is difficult to converge the corresponding exposure value into a normal-exposure range. Similarly, if the exposure parameter is adjusted by an excessively small predetermined exposure parameter, the illumination of the object is changed slightly. Thus, numerous adjustment steps are only required, resulting in slow convergence. Hence, the digital image is excessive dark or excessive bright due to a long exposure duration, thus the image quality is adversely affected.

SUMMARY OF THE INVENTION

The object of the invention is to efficiently adjust an exposure parameter according to the illumination of a captured object. Thus, the corresponding exposure value can be rapidly adjusted to be within the normal-exposure range.

Accordingly, the present invention provides an image capture chip, comprising an image sensor, a calculating logic circuit, and a refreshing logic circuit. According to an exposure parameter, the image sensor comprising a plurality of sensor units captures an image to provide a plurality of exposure values. The calculating logic circuit calculates an average exposure value according to the exposure values.

If the average exposure value is within a first exposure range, the refreshing logic circuit maintains the exposure parameter, and accordingly drives the image sensor to capture a next image. If the average exposure value is within a second exposure range, the refreshing logic circuit adjusts the exposure parameter according to a first exposure extreme, and accordingly drives the image sensor to capture a next image. If the average exposure value is within a third exposure range, the refreshing logic circuit adjusts the exposure parameter according to a second exposure extreme, and accordingly drives the image sensor to capture a next image.

The first exposure range is referred to as a normal-exposure range, the second exposure range is referred to as an over-exposure range, and the third exposure range is referred to as an under-exposure range.

Furthermore, the image capture chip is capable of determining whether the captured image meets an image quality condition according to an image feature prior to determining whether the average exposure value is within the normal-exposure range.

Accordingly, the present invention provides an image capture chip, comprising an image sensor, a calculating logic circuit, and a refreshing logic circuit. According to an exposure parameter, the image sensor comprising a plurality of sensor units captures an image to provide a plurality of exposure values. The calculating logic circuit calculates an average exposure value according to the exposure values. The refreshing logic circuit at least comprises a determining logic circuit, which is capable of determining whether the captured image meets an image quality condition.

Thus, when the captured image meets the image quality condition, the refreshing logic circuit maintains the exposure parameter even if the average exposure value is within the over-exposure range or the under-exposure range.

Additionally, both of the image capture chips can be disposed in an optical mouse, for improving operational sensitivity of the optical mouse.

Accordingly, the present invention provides an optical mouse with an image capture chip. The optical mouse comprises a light source, an optical lens, an image sensor comprising a plurality of sensor units, a calculating logic circuit, and a refreshing logic circuit. The light source illuminates an object to obtain a reflected image. The optical lens projects the reflected image to result a projected image. The image sensor captures the projected image according to an exposure parameter to provide a plurality of exposure values. The calculating logic circuit calculates an average exposure value according to the exposure values. The refreshing logic circuit is capable of determining whether the captured image meets an image quality condition.

To determine whether the exposure parameter requires to be adjustment. The refreshing logic circuit is capable of distinguishing the image quality of the captured image before or after determining whether the corresponding average exposure value is within the normal-exposure range.

BRIEF DESCRIPTION OF THE DRAWINGS

The invention will become apparent by referring to the subsequent detailed description of a preferred embodiment with reference to the accompanying drawings, wherein.

DETAILED DESCRIPTION OF THE INVENTION

The object of the invention is to efficiently adjust an exposure parameter according to the illumination of a captured object. Thus, the corresponding exposure value can be rapidly adjusted to be within the normal-exposure range.

Figure 2:
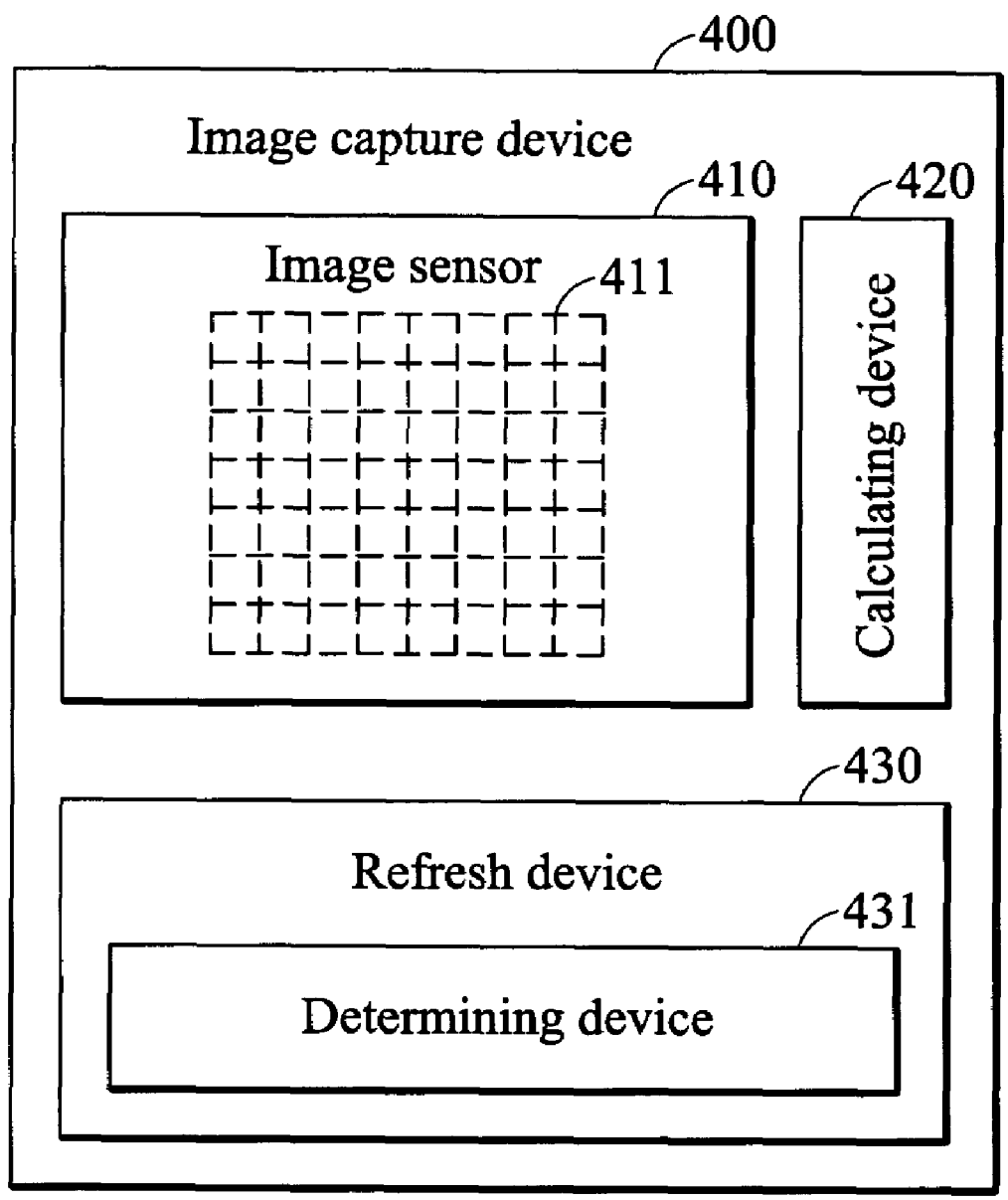
FIG. 2 is a diagram of an image capture chip of the present invention.

FIG. 2 is a diagram of an image capture chip of the present invention. Image capture chip 400 comprises an image sensor 410 having a plurality of sensor units 411, a calculating logic circuit 420, and a refreshing logic circuit 430. When the image capture chip 400 captures an image, according to an exposure parameter, the image sensor 410 provides a plurality of exposure values via the sensor units 411. When receiving the exposure values, the calculating logic circuit 420 calculates an average exposure value according to the exposure values. The refreshing logic circuit 430 adjusts the exposure parameter according to the exposure sample to change the exposure duration of the image sensor 410. Thus, an unexpected average exposure value can be adjusted to be within the normal-exposure range.

Figure 1A:
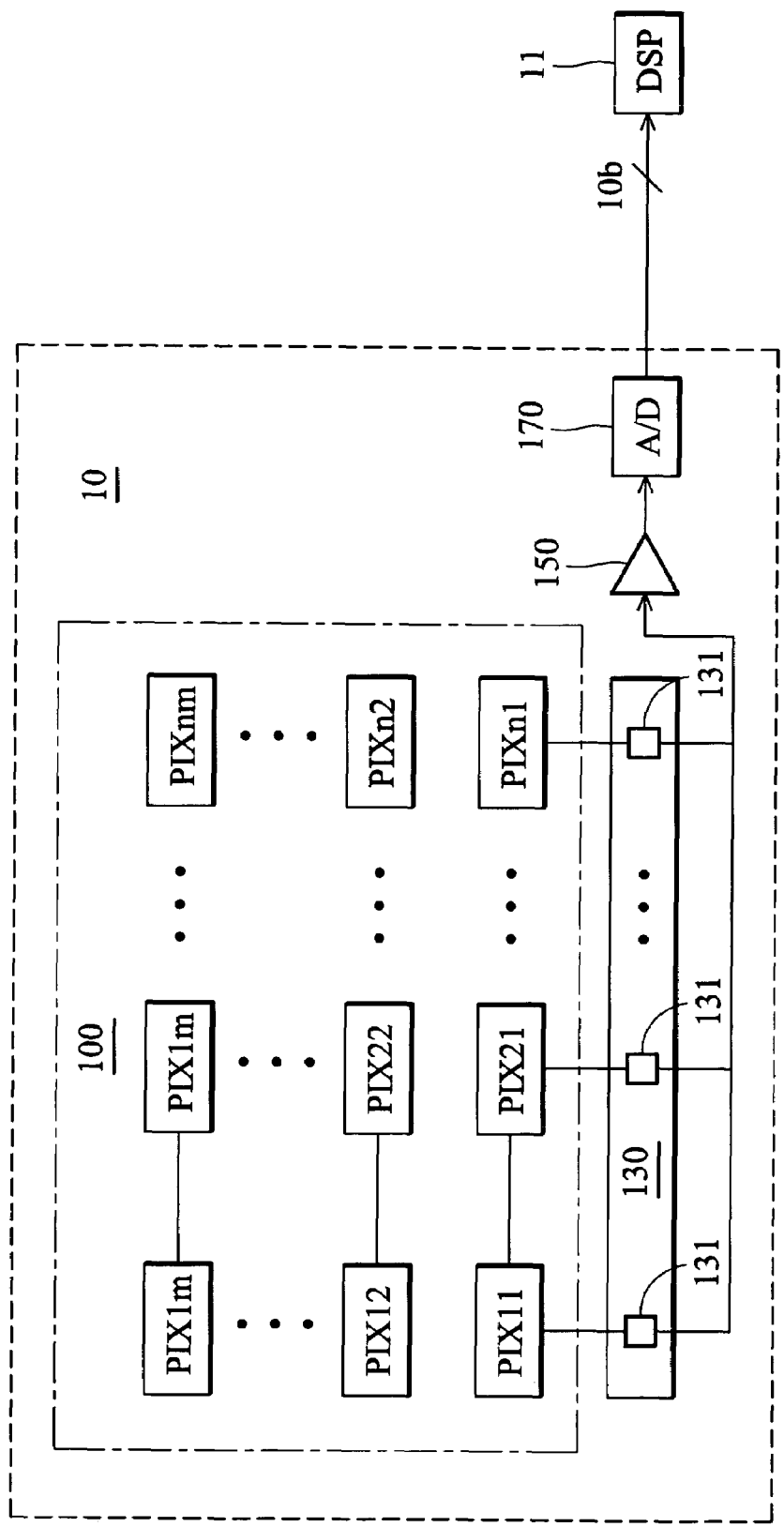
FIG. 1A is a diagram of a conventional image capture chip.
Figure 1B:
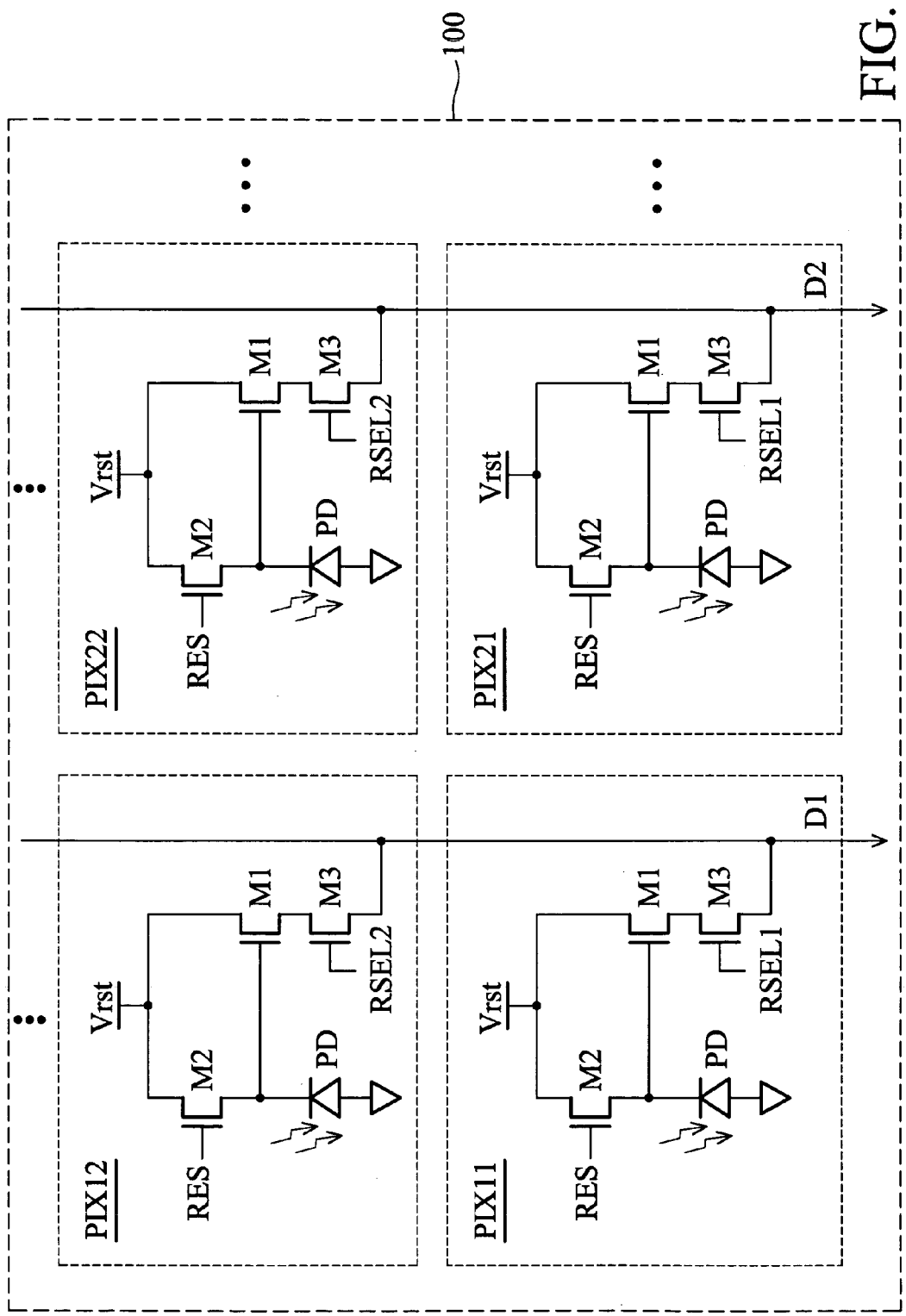
FIG. 1B is a diagram of the image sensor 100 of FIG. 1A.
Figure 3:
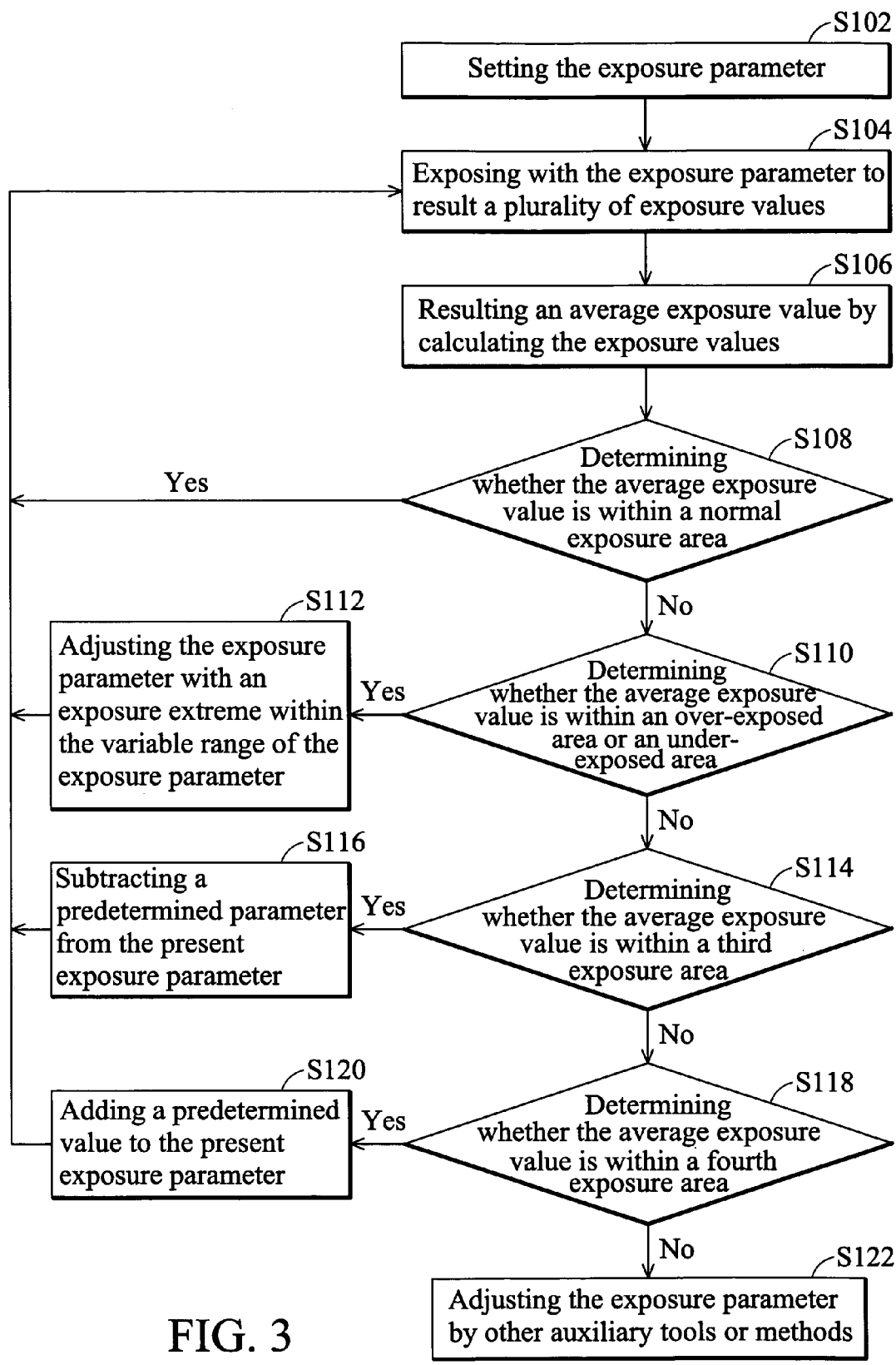
FIG. 3 is a flowchart of the exposure control method of the present invention.

FIG. 3 is a flowchart of the exposure control method of the present invention. Initially, Step S102 sets an exposure parameter of an image sensor. Step S104 follows and sets the exposure duration of the image sensor according to the exposure parameter, and then executes an exposure to capture an image via the image sensor. After exposure via the image sensor, the voltage across the optical diodes PD in FIG. 1A and FIG. 1B is read by the signal reading circuit 130, and the charge corresponding to the voltage is stored in the corresponding storage 131.

Step S106 follows and provides the average exposure value according to the charge of each storage 131. Step S108 follows and determines whether the average exposure value is in a normal-exposure range. If the result of step S108 is positive, step 104 follows and maintains the present exposure parameter and executes an exposure to capture a next image via the image sensor.

If the result of step S108 is negative, step S110 follows and determines whether the average exposure value is in an over-exposure range or an under-exposure range. If the result of step S110 is positive, step S112 follows and adjusts the exposure parameter according to an exposure extreme within the variable range of the exposure parameter. Step S104 follows and executes an exposure to capture a next image according to the adjusted exposure parameter via the image sensor.

For example, if the average exposure value is within the over-exposure range, the image capture chip 400 calculates a new exposure parameter by averaging a minimum exposure parameter and the present exposure parameter. Similarly, if the average exposure value is within the under-exposure range, the image capture chip 400 calculates a new exposure parameter by averaging a maximum exposure parameter and the present exposure parameter.

If the result of step S110 is negative, step S114 follows and determines whether the average exposure value is between the normal-exposure range and the over-exposure range, the third exposure range. If the average exposure value is within the third exposure range, step S116 follows and calculates a new exposure parameter by subtracting a predetermined parameter from the present exposure parameter, and then, step S104 follows and executes an exposure to capture a next image according to the new exposure parameter via the image sensor.

If the result of step S114 is negative, step S118 follows and determines whether the average exposure value is between the normal-exposure range and the under-exposure range, the fourth exposure range. If the average exposure value is within the fourth exposure range, step S120 follows and calculates a new exposure parameter by adding a predetermined parameter to the present exposure parameter, and then, step S104 follows and executes an exposure according to the new exposure parameter via the image sensor.

If the average exposure value is not within the normal-exposure range, when the exposure parameter equals maximum exposure parameter, the image sensor is not able to execute an exposure according to the illumination of the captured image. Thus, step S122 follows and adjusts the illumination of the captured image by other auxiliary tools or methods. For example, a photoflash is used to illuminate the object, thereby enhancing the illumination of the captured image.

Figure 4:
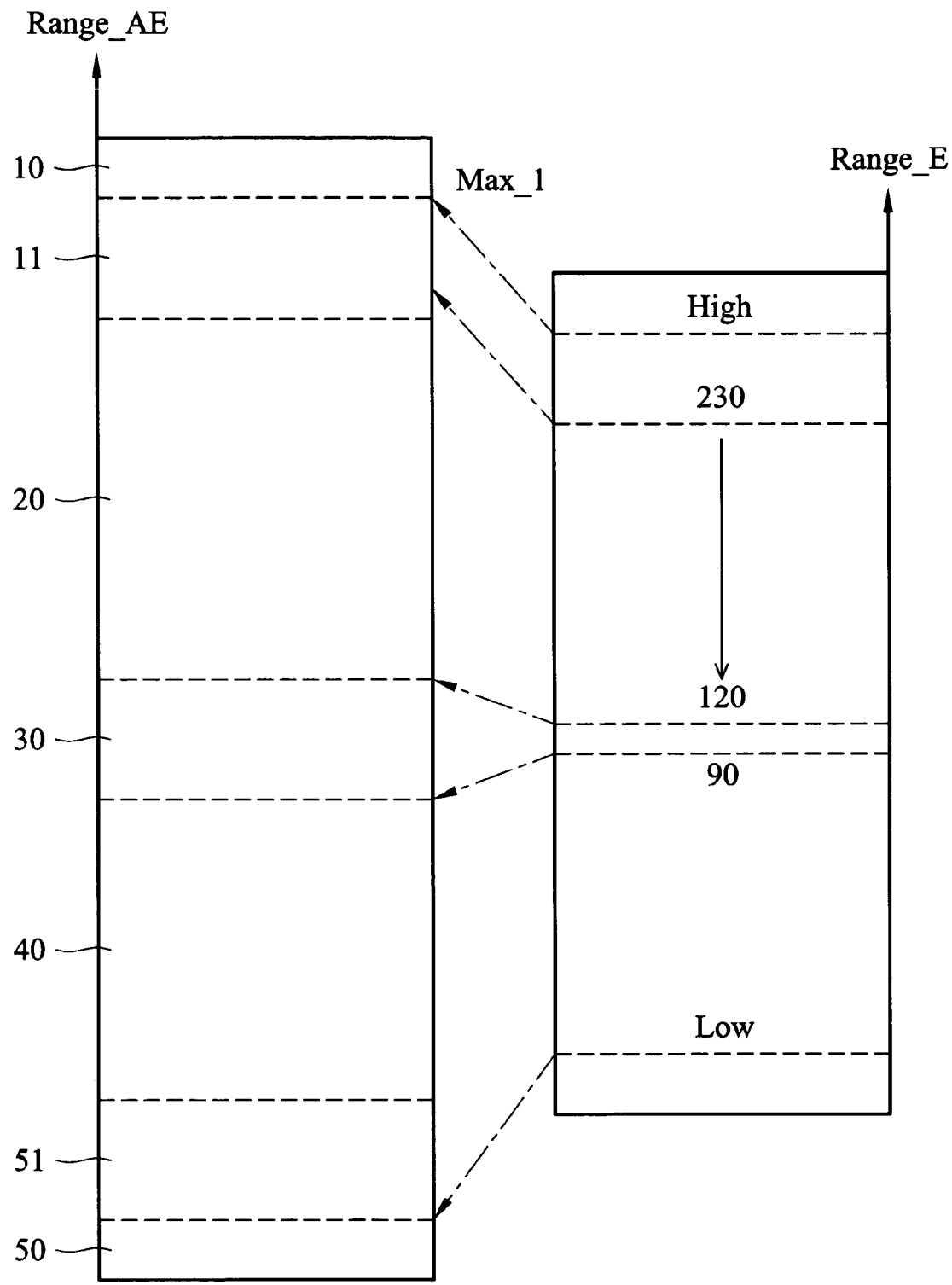
FIG. 4 is a schematic diagram of the exposure parameter adjustment process of the present invention.

FIG. 4 is a schematic diagram of the exposure parameter adjustment process of the present invention. The right scale Range_E can be divided into a plurality of sub-ranges defined by two exposure parameters, and similarly, the left scale Range_AE can be divided into a plurality of sub-ranges defined by two average exposure values. The scale Range_AE includes an over-exposure range 11, a high exposure range 20, a normal-exposure range 30, a low exposure range 40, and an under-exposure range 51.

If the maximum value Max and minimum value Min of the exposure parameter are 235 and 20, respectively, a predetermined exposure parameter M is 10, a present exposure parameter is 230, and an average exposure value caused by the present exposure parameter is within the overexposure range 11. Additionally, an average exposure value is within the normal-exposure range 30 if its corresponding exposure parameter is between 90~120. Thus, the exposure control method is used for adjusting the present exposure parameter until the present exposure parameter is within the 90~120 range.

According to the present invention, initially, the new exposure parameter is calculated by averaging the minimum value Min and the present exposure parameter. Thus, the new exposure parameter is equal to 125 calculated by averaging 20 and 230. The image capture chip then executes an exposure to capture a next image according to the new exposure parameter. Thus, a new average exposure value caused by the new exposure parameter is provided and can be within the high exposure range 20. According to the exposure control method of the present invention, the new exposure parameter must be subtracted from the predetermined exposure parameter M, 10. Hence, a new exposure parameter is equal to 115 or between 90~120. Obviously, a new average exposure value caused by the new exposure parameter can be converged within the normal-exposure range 30. Following the steps as mentioned, to achieve a new average exposure value within the normal-exposure range 30, the present exposure parameter is adjusted only twice according to the present invention.

Contrary to the present invention, by using the conventional exposure control method, the exposure parameter is adjusted by continuously adding or subtracting a predetermined exposure parameter L until the corresponding average exposure value is within the normal-exposure range 30. If the predetermined exposure parameter L is 20, a new exposure parameter equal to 110 is derived by calculating the equation: 230−6*20. Thus, a new average exposure value resulting from the new exposure parameter is converged into the normal-exposure range 30. According to the above description, the present exposure parameter must be adjusted six times. Hence, the conventional exposure control method requires more adjustment steps than the present invention. Obviously, the exposure control method of the present invention has faster convergence speed than the conventional method.

Figure 5:
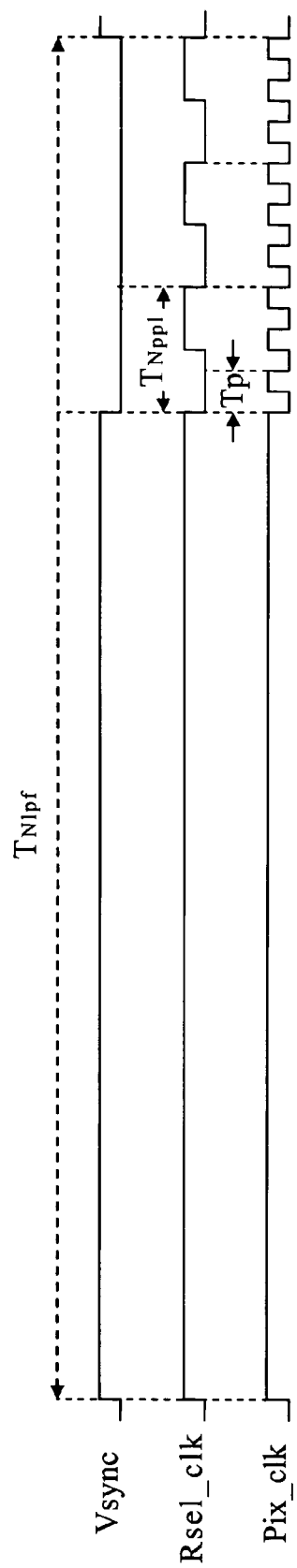
FIG. 5 is a chronological chart of an image sensor reading an image of the present invention.

FIG. 5 is a chronological chart of an image sensor of the present invention reading an image. In FIG. 5, $T_p$ is pixel time which refers to a pixel reading duration, $N_{ppl}$ is the total number of pixel times for reading a line, thus, a line time $T_{Nppl}$ is defined as "$T_{Nppl}=T_p*N_{ppl}$". $N_{lpf}$ is the total number of line times for reading a frame, thus, a frame time $T_{Nlpf}$ is defined as "$T_{Nlpf}=T_p*N_{ppl}*N_{lpf}$". Additionally, $V_{sync}$ is a synchronous signal for receiving pixel signals by the image sensor, and $R_{sel\_n}$ is a select signal for selecting which one of the row of the pixel units is to be charged.

For example, suppose that the pixel time $T_p$ is 1 μs, number $N_{ppl}$ is 40, and the number $N_{lpf}$ is 20, thus a line time $T_{Nppl}$ is 40 μs according to the product of the pixel time $T_p$ and the number $N_{ppl}$. The frame time $T_{Nlpf}$ or the longest exposure duration is equal to 800 μs according to the product of the line time $T_{Nppl}$ and the number $N_{lpf}$. Hence, a frame rate is equal to 1250 frame/sec by calculating the inverse value of the frame time $T_{Nlpf}$.

Accordingly, if fixing the pixel time as $T_p$ and the number as $N_{ppl}$, the longest exposure duration $T_{Nlpf}$ and the frame rate can be adjusted by only adjusting the number $N_{lpf}$. For example, if the number $N_{lpf}$ is increased to 40, the longest exposure duration $T_{Nlpf}$ is increased to 1600 (μs), thus the frame rate is decreased to 625 (frame/sec), increasing the exposure duration.

With reference to the illumination as shown in FIG. 1B, when capturing an image, the image sensor can enable the NMOS M2 by the reset signal RES to determine a start time of the optical diode PD to be illuminated, thereby controlling the exposure values of the image sensor 100.

Thus, the present invention also provides two parameters, which comprising a pixel number $N_p$ and a line number $N_l$, to set a starting time of the reset signal RES. The start time of the reset signal RES is adjusted by the pixel number $N_p$ and the line number $N_l$, thus the unexposed duration $T_{unexp}$ is able to be calculated by the pixel number $N_p$ and line number $N_l$ as the following equation:

$$T_{unexp} = T_p * (N_p + N_{ppl} * N_l)$$
$$= T_p * N_p + T_{Nppl} * N_l$$

For example, suppose that the pixel time $T_p$ is 1 μs, the number $N_{ppl}$ is 40, and the number $N_{lpf}$ is 20, thus, the frame time $T_{Nlpf}$ or the longest exposure duration is equal to 800 μs. Additionally, suppose that an unexposed duration $T_{unexp}$ is equal to the duration of reading three lines and ten pixels. Thus, the pixel number $N_p$ is 10, and the line number $N_l$ is 3. Hence, following the equations as mentioned, the unexposed duration $T_{unexp}$ is equal to 130 μs.

Additionally, an exposed duration $T_{exp}$ is calculated by subtracting the unexposed duration $T_{unexp}$ from the longest exposure duration as shown in following equation:

$$T_{exp} = T_{Nlpf} - T_{unexp}$$

Hence, the exposed duration $T_{exp}$ is equal to 670 (μs). If the illumination of the image is increased, the exposure duration can be decreased by adjusting the pixel number $N_p$ and line number $N_l$ to obtain a suitable exposure parameter. For example, the pixel number $N_p$ is increased to 30 and the line number $N_l$ is maintained, and the unexposed duration $T_{unexp}$ is then increased to 150 μs and the exposed duration $T_{exp}$ is decreased to 650 μs.

Figure 6:
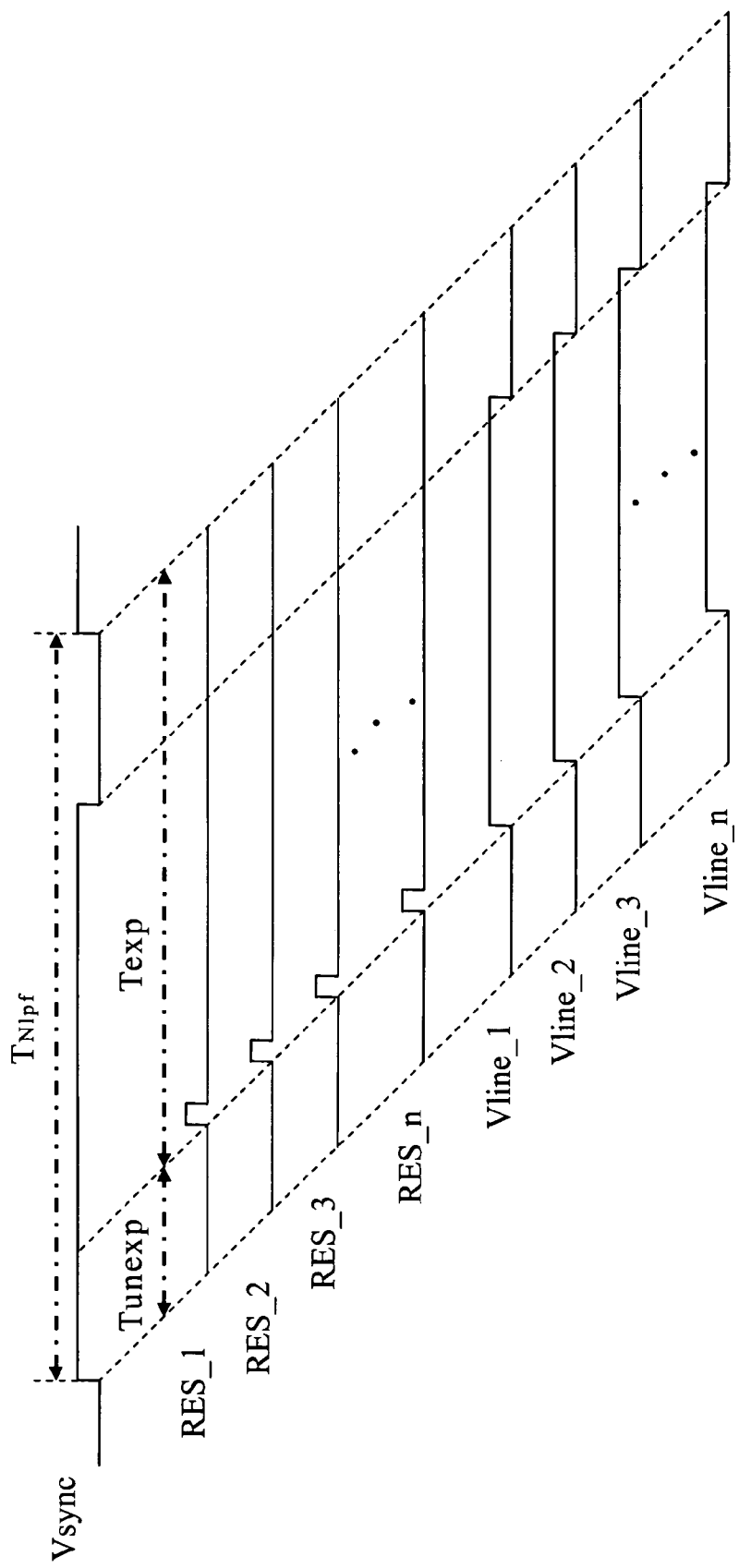
FIG. 6 is a schematic diagram of the exposed duration and the unexposed duration.

FIG. 6 is a schematic diagram of the exposed duration and the unexposed duration. RES_1 to RES_n are represented as n-rows reset control signal, respectively. The $V_{line\_1}$ to $V_{line\_n}$ are represented by n-rows pixel exposure duration, respectively.

Generally, to maintain stable frame rate, adjustment of the number $N_{lpf}$ is not required. Hence, if the frame time $T_{Nlpf}$ is maintained, the reset signal RES can be determined by adjusting the unexposed duration $T_{unexp}$ or the exposure duration of the image sensor.

Furthermore, the present invention provides an optical mouse comprising the image capture chip. If the feature of an image is recognized by the image capture chip, the optical mouse is capable of processing related image procedures without adjustment the exposure parameter. Hence, to determine whether the exposure parameter requires adjustment, the image capture chip is capable of distinguishing the image quality of the captured image before or after determining whether the corresponding average exposure value is within the normal-exposure range.

To achieve the above, the refreshing logic circuit 430 as shown in FIG. 2 also comprises a determining logic circuit 431, which is capable of determining whether the captured image meets an image quality condition.

The image quality condition is determined according to features of a one-dimensional image. For example, a sinusoidal function wave is obtained according to the brightness of each pixel, number of features of the one-dimensional image can then be obtained by counting the number of peaks in the sinusoidal function wave. Thus, according to the number of features, the image capture chip 400 is capable of determining whether the captured image meets the image quality condition. Similarly, in a two-dimensional image, the image quality condition is determined by a two-dimension image processing method. For example, a two-dimensional function wave is drawn according to the brightness of each pixel. It can then determine the number of features according to a plurality of characteristics such as rolling hills of the two-dimensional functional wave. Thus, the image quality of the two-dimensional image is determined by comparing the number of features with a predetermined table, which stores various conditions with feature number and corresponding image quality.

The method for determining image quality is not limited to the method disclosed, but can include any image processing method.

If the captured image meets the image quality condition, the exposure parameter is maintained even if the average exposure value is within the over-exposure range or the under-exposure range. In addition, if the captured image does not meet the image quality condition, and the average exposure value is within the over-exposure range or the under-exposure range, the exposure parameter is adjusted.

Figure 7:
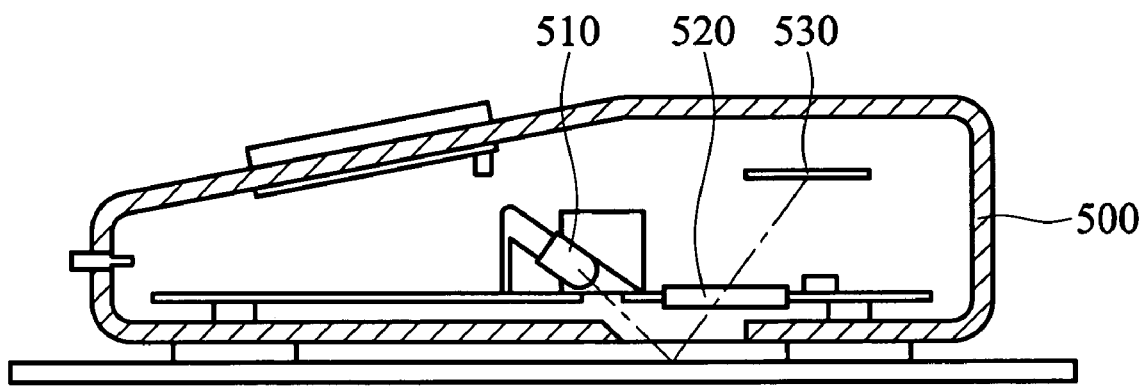
FIG. 7 is a schematic diagram of an optical mouse of the present invention.

FIG. 7 is a schematic diagram of an optical mouse of the present invention. Optical mouse 500 comprises a light source 510, an optical lens 520, and a image capture chip 530, wherein the light source 510 is light emitting diode (LED).

When the LED illuminates an object, light is reflected to the optical lens 520 and projected on the image capture chip 530, whereby the image capture chip 530 executes subsequent related image process procedures.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture chip, comprising:
an image sensor with a plurality of sensor units, capturing an image to provide a plurality of exposure values when determining an exposure parameter;
a calculating logic circuit, calculating an average exposure value of the exposure values; and
a refreshing logic circuit,
maintaining the exposure parameter if the average exposure value is within a first exposure range, and accordingly driving the image sensor to capture a next image;
adjusting the exposure parameter according to a first exposure extreme if the average exposure value is within a second exposure range, and accordingly driving the image sensor to capture a next image; and
adjusting the exposure parameter according to a second exposure extreme if the average exposure value is within a third exposure range, and accordingly driving the image sensor to capture a next image;
wherein, the first exposure range is between the second exposure range and the third exposure range, and, the first exposure extreme and the second exposure extreme are referred to as a maximum parameter and a minimum parameter, respectively, within the variable range of the exposure parameter,
and wherein the exposure parameter comprises a pixel number, a line number, and a total number of line times for reading a frame.

2. An image capture chip, comprising:
an image sensor with a plurality of sensor units, capturing an image to provide a plurality of exposure values when determining an exposure parameter;
a calculating logic circuit, calculating an average exposure value of the exposure values; and
a refreshing logic circuit at least comprising a determining logic circuit, determining whether the captured image meets an image quality condition;
wherein, if the captured image meets the quality condition, the refreshing logic circuit maintains the exposure parameter and accordingly drives the image sensor to capture a next image, and if the captured image does not meet the quality condition, the refreshing logic circuit determines the exposure parameter and accordingly drives the image sensor to capture a next image,
and wherein the exposure parameter comprises a pixel number, a line number, and a total number of line times for reading a frame.

3. An optical mouse, comprising:
a light source, illuminating an object to generate a reflected image;
an optical lens, projecting the reflected image to generate a projected image;
an image sensor with a plurality of sensor units, capturing the projected image to provide a plurality of exposure values when determining an exposure parameter;
a calculating logic circuit, calculating an average exposure value of the exposure values; and
a refreshing logic circuit,
maintaining the exposure parameter if the average exposure value is within a first exposure range, and accordingly driving the image sensor to capture a next image;
adjusting the exposure parameter according to a first exposure extreme if the average exposure value is within a second exposure range, and accordingly driving the image sensor to capture a next image; and
adjusting the exposure parameter according to a second exposure extreme if the average exposure value is within a third exposure range, and accordingly driving the image sensor to capture a next image;
wherein, the first exposure range is between the second exposure range and the third exposure range, and, the first exposure extreme and the second exposure extreme are referred to as a maximum parameter and a minimum parameter, respectively, within the variable range of the exposure parameter,
and wherein the exposure parameter comprises a pixel number, a line number, and a total number of line times for reading a frame.

4. An exposure control method, for adjusting an exposure parameter of an image sensor, comprising following steps:
setting the exposure parameter of the image sensor;
exposing with the exposure parameter to result a plurality of exposure values;
resulting an average exposure value by calculating the exposure values;

determining whether the average exposure value is within a first exposure area, a second exposure area, or an third exposure area;

maintaining the exposure parameter if the average exposure value is within a first exposure range;

adjusting the exposure parameter according to a first exposure extreme if the average exposure value is within a second exposure range; and adjusting the exposure parameter according to a second exposure extreme if the average exposure value is within a third exposure range;

wherein, the first exposure range is between the second exposure range and the third exposure range, and, the first exposure extreme and the second exposure extreme are referred to as a maximum parameter and a minimum parameter, respectively, within the variable range of the exposure parameter, and wherein, the exposure parameter comprises a pixel number, a line number, and a total number of line times for reading a frame.

* * * * *